(12) United States Patent
Pyron

(10) Patent No.: US 6,737,575 B2
(45) Date of Patent: May 18, 2004

(54) CONDUIT BODY ADAPTER MODULE

(75) Inventor: Roger Pyron, Bartlett, TN (US)

(73) Assignee: Thomas & Betts International, Inc., Sparks, NV (US)

(*) Notice: Subject to any disclaimer, the term of this patent is extended or adjusted under 35 U.S.C. 154(b) by 0 days.

(21) Appl. No.: 10/102,532

(22) Filed: Mar. 20, 2002

(65) Prior Publication Data

US 2002/0167168 A1 Nov. 14, 2002

Related U.S. Application Data

(60) Provisional application No. 60/278,602, filed on Mar. 26, 2001.

(51) Int. Cl.[7] .................................................. H02G 3/08
(52) U.S. Cl. .............................. 174/50; 174/58; 174/63; 220/4.02
(58) Field of Search ............................ 174/50, 58, 63; 220/3.8, 4.02; 439/535; 248/906

(56) References Cited

U.S. PATENT DOCUMENTS

| | | | | | |
|---|---|---|---|---|---|
| 3,139,480 A | * | 6/1964 | Desloge | ...................... | 174/65 R |
| 3,210,458 A | * | 10/1965 | Palmer | ........................ | 174/51 |
| 4,801,118 A | * | 1/1989 | Wium | ........................ | 248/300 |
| 4,896,784 A | * | 1/1990 | Heath | ........................ | 220/3.2 |
| RE35,075 E | * | 10/1995 | Lammens, Jr. | ............... | 220/3.2 |

* cited by examiner

Primary Examiner—Dhiru R Patel
(74) Attorney, Agent, or Firm—Hoffmann & Baron, LLP

(57) ABSTRACT

A universal conduit body adapter includes an elongate generally tubular body having a pair of opposed substantially parallel side portions bounded by a pair of opposed ends, with the body defining an upper and a lower surface. A pair of mounting holes are at the lower surface with one hole being located adjacent each body end for mounting the adaptor to a conduit body. A plurality of pairs of holes are located at the upper surface with one hole of each pair being located adjacent each body end. The holes of the plurality of pairs are spaced in non-registry with the mounting holds at the lower surface and are compatibly spaced to attach to an electrical fixture component.

2 Claims, 4 Drawing Sheets

CONDUIT BODY ADAPTER MODULE

This application claims the benefit of U.S. Provisional Application No. 60/278,602, filed Mar. 26, 2001.

FIELD OF THE INVENTION

The present invention relates to a conduit body adapter containing electrical wires and more particularly to a conduit body adapter that is attachable to conduits and is universally compatible with virtually all standard fixtures, such as light switches, cable outlets, electrical outlets, telephone outlets and the like.

BACKGROUND OF THE INVENTION

Conduits are often used to contain electrical wires that run throughout buildings and other structures. At certain locations therealong such electrical wires are connected to standard fixtures, such as light switches, cable outlets, electrical receptacles, telephone outlets and the like. Code requirements specify that the connections, i.e., the splicing and joining of the electrical wires to such standard fixtures, be contained within a housing that has sufficient interior volume to handle the frequently large number of wire connections that may be required. Junction boxes, which have sufficient interior volume to satisfy code requirements, are typically used to house the electrical wire leading to standard fixtures.

Conventional techniques of connecting electrical wires located in conduits to standard fixtures involve cutting into the conduit system and installing a conventional junction box in which receptacles may be terminated. These conventional techniques are less than desirable because they often require duplication of components and supports and makes interconnections difficult or awkward. Furthermore, while conduit bodies are known for making splices and direction changes in conduit runs, these conduit bodies do not have the interior volume necessary to house a switch or receptacle.

Attempts to provide a secure and continuous housing of electrical wires within a conduit include an extension box conduit system as disclosed in U.S. patent application No. Re 35,075 issued to Lammens, Jr., which describes the use of an extension box which can be used as a junction box. However, the extension boxes disclosed by Lammens are limited in use because they are not universally compatible with all standard fixtures. Thus, some fixtures that are attached to this extension box must be replaced with compatible fixtures. This introduces added inconvenience and expense.

Accordingly, it is desirable to provide a conduit body adapter that is universally compatible with virtually all types of electrical fixtures and electrical fixture components thereby providing secure and continuous housing for electrical wire connections between a conduit and a fixture, such as light switches, cable outlets, electrical outlets, telephone outlets, cover plates, and the like.

SUMMARY OF THE INVENTION

In one aspect of the invention, a universal conduit body adapter is provided including an elongate generally tubular body having a pair of opposed substantially parallel side portions bounded by a pair of opposed ends. The body defines an upper and a lower surface. A pair of mounting holes are at the lower surface with one hole being located adjacent each body end for mounting the adaptor to a conduit body. A plurality of pairs of holes are at the upper surface with one hole of each pair being located adjacent each body end. The holes of the plurality of pairs are spaced in non-registry with the mounting holds at the lower surface and are compatibly spaced to attach to an electrical fixture component.

In a further aspect of the invention, a universal conduit body adapter includes an elongate tubular sidewall having an upper rim, a lower rim, and a pair of parallel portions bounded by a pair of curved ends. A first screw hole plate bridges the parallel portions of the sidewall, is planar with the upper rim, and has a plurality of first screw holes. A second screw hole plate bridges the parallel portions of the sidewall, is planar with the upper rim, and has a plurality of second screw holes. A pair of mounting bosses is arranged on the lower rim with each mounting boss toward a respective curved end. The pair of mounting bosses are planar with the lower rim and define a pair of mounting holes for mounting the adapter to a conduit body.

With the foregoing and additional features in mind, this invention will now be described in more detail, and other benefits and advantages thereof will be apparent from the following detailed description when taken in conjunction with the accompanying drawings, in which like numerals represent identical elements throughout the several views.

DETAILED DESCRIPTION OF THE PREFERRED EMBODIMENTS

The present invention, which addresses the needs of the prior art, provides a universal conduit body adapter that securely attaches to standard conduit bodies and is universally compatible with virtually all standard fixtures, such as light switches, phone jacks, coaxial cables, photo cells, and the like. The inventive adapter or adapter module attaches to conduit bodies to protect all wires therein and eliminates the need for a separate junction box. Thus, the universal adapter of the present invention allows existing fixtures to be retrofitted without the need for additional or new fixtures. As a result, the cost of retrofitting such fixtures is reduced by using the inventive adapter.

Figure 1:
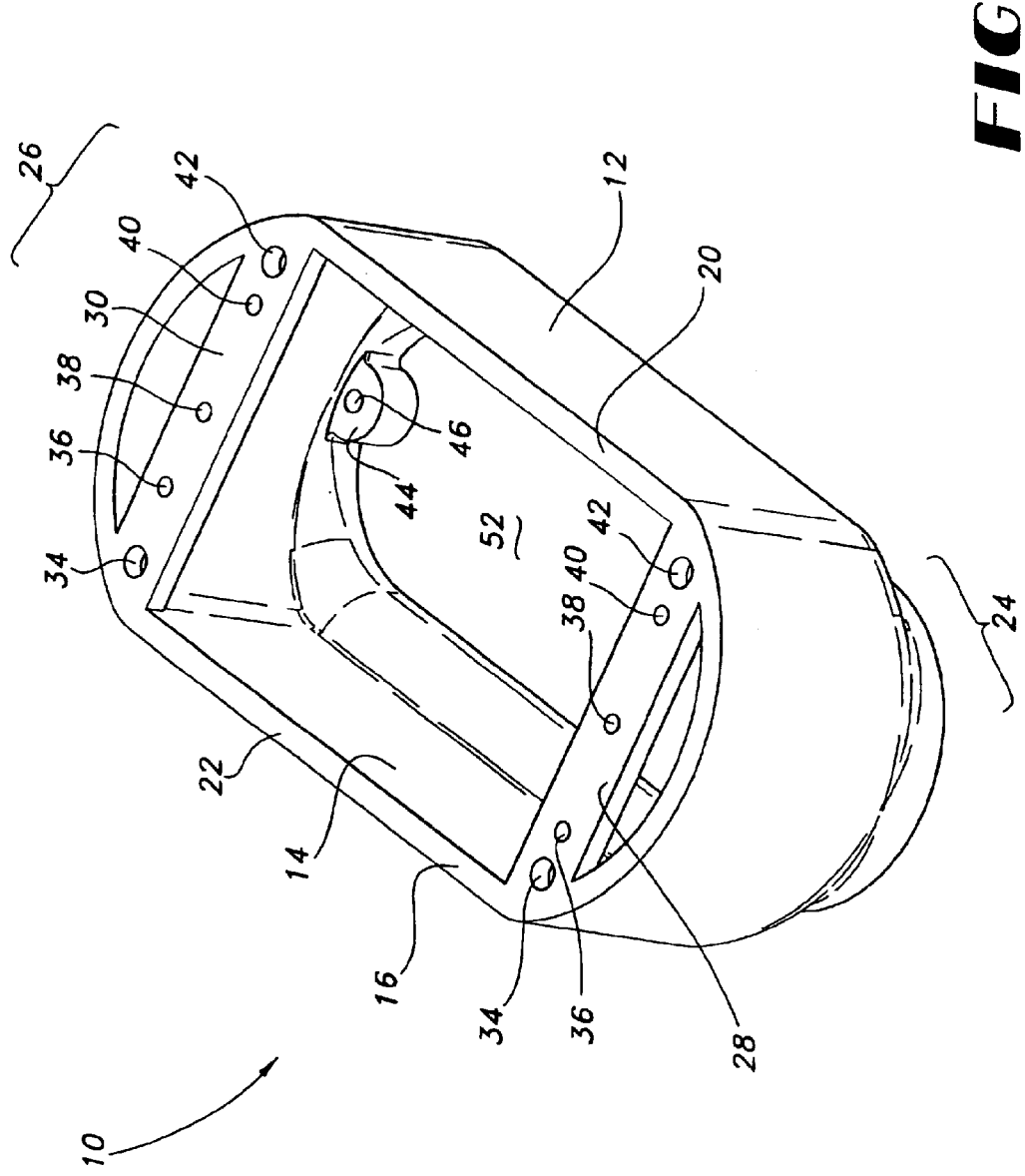
FIG. 1 is a top perspective view of the conduit body adapter of the present invention.

Referring now to FIG. 1, an embodiment of a conduit body adapter according to the invention is shown. The adapter 10 has an elongate generally tubular shaped body with an upwardly extending sidewall 12 having an open upper end defined by a generally oval-shaped planar upper rim 16 and an open lower end defined by a generally oval-shaped planar lower rim 18. Sidewall 12 includes two generally parallel opposed side portions 20 and 22 bounded by two generally curved opposed ends 24 and 26 and perimetrically bounds and defines an interior space 52 therein.

Upper rim 16 defines an upper surface which includes a plurality of pairs of holes 34, 36, 38, 40, 42 disposed at the upper surface with one hole of each pair located adjacent each body end. It is to be understood, however, that the invention is intended to encompass other configurations of the plurality of holes. For example, FIG. 1 shows five pairs of holes, however, the plurality of pairs is not limited to this amount. It is within the scope of the invention to have two or more pairs of holes arranged in any configuration at the upper surface which is defined by the upper rim 16. There are no particular limitations to the number, size, or distribution of the screw holes of the invention, as long as they fulfill the purpose of providing desired access to fittings of standard electrical fixtures. The size of the screw hole pairs 34, 36, 38, 40, and 42 may be the same or different. Although, generally speaking, the holes within each pair will be the same size.

Furthermore, in the embodiment illustrated in FIG. 1, the plurality of holes 34, 36, 38, 40, and 42 are located on inwardly projecting portions adjacent each opposed end shown here as universal screw hole plates 28 and 30 which bridge the parallel portions 20 and 22 of sidewall 12. In this particular aspect of the invention, the plates 28 and 30 are disposed toward the curved ends 24 and 26, respectively. However, it is within the scope of the invention for the holes to be arranged on the upper rim 16 itself, or in rim extensions, bosses, tabs, and the like extending from the upper rim 16.

In one aspect of the invention, screw hole plates 28 and 30 include two pairs of outer screw holes 34, 42, two pairs of middle screw holes 36, 40, and a pair of inner screw holes 38. In a desirable aspect of the invention, the outer screw hole pairs 34, 42 are all one size; the middle screw holes 36, 40 are all one size, and the inner screw holes 38 are the same size as one another. In a particularly desirable aspect of the invention, the size of screw hole pairs 34, 42 is different than that of middle screw hole pairs 36, 40, and inner screw hole pair 38. Even more preferably, the size of screw hole pairs 34, 42 is larger than that of 36, 40, which in turn is larger than the size of screw hole pair 38. The holes on screw hole plates 28 and 30 are universally compatible with the screw holes of virtually any fixture and fixture plate.

It is desirable that an interior surface 14 of sidewall 12 as well as rims 16 and 18 be smoothly formed so as to reduce or avoid the possibility of abrading wires that may rub across the edges thereof during wire insertion, fixture installation, and the like. Desirably, the screw hole plates 28 and 30, if present, are similarly smoothly formed.

Figure 2:
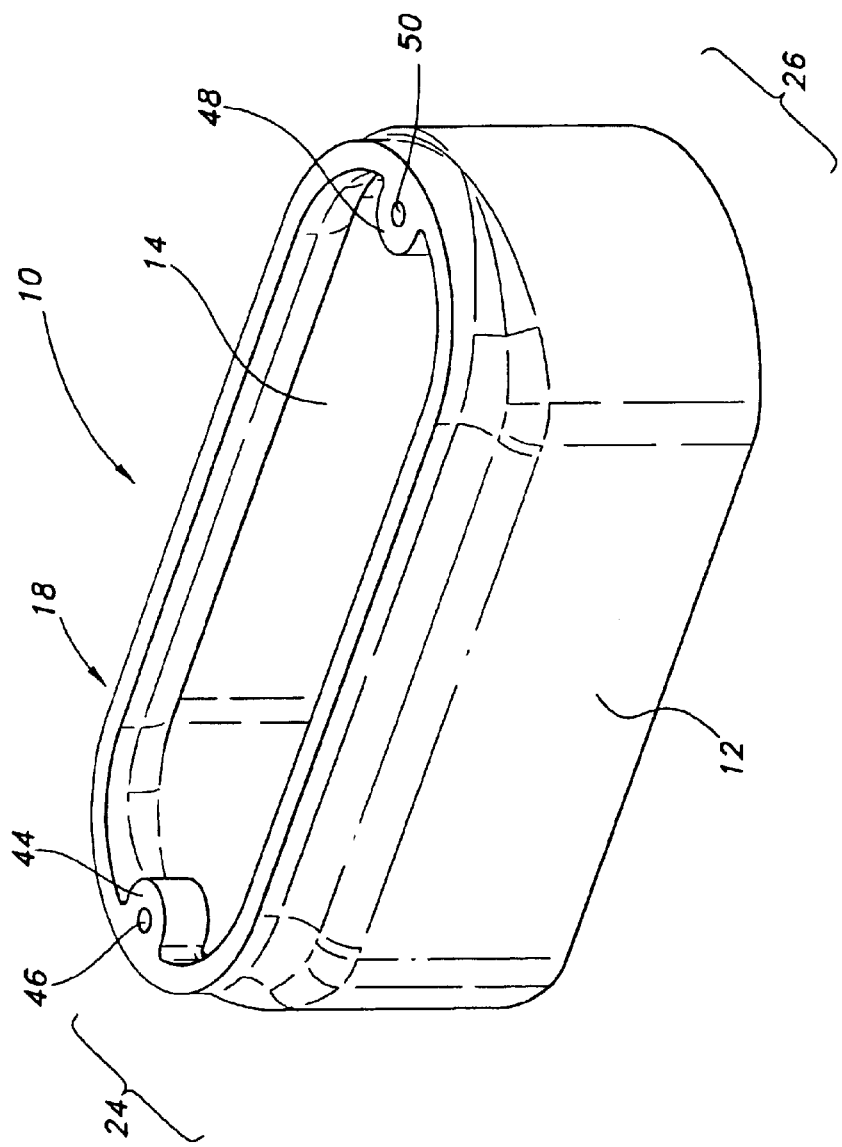
FIG. 2 is a bottom perspective view of the conduit body adapter of FIG. 1.

Referring now to FIG. 2, it can be seen that lower rim 18 defines a lower surface which includes at each curved end 24 and 26, a mounting boss 44 and 48, defining a mounting hole 46 and 50, respectively. While mounting bosses are preferred, other configurations of the lower surface for the mounting holes 46 and 50 are envisioned within the scope of the invention. For example, the holes may be arranged on the rim, rim extensions, tabs, and the like. It should be noted that mounting holes 46 and 50 are not in registry with any of the pairs of holes 34, 36, 38, 40 or 42.

Figure 3:
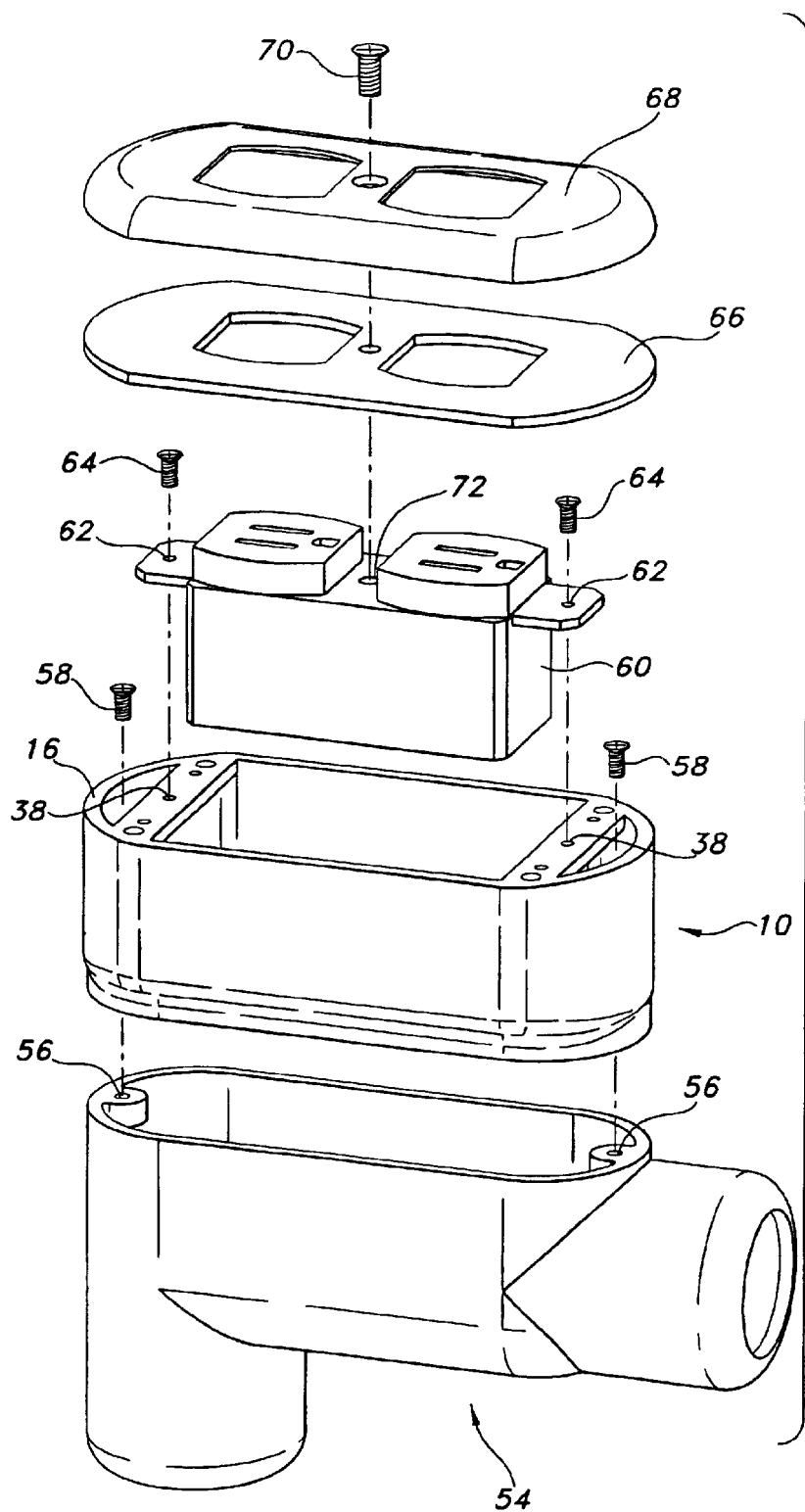
FIG. 3 is an exploded perspective front view of an assembly of the conduit body adaptor of the present invention with a conduit body and a standard electrical fixture.

Referring now to FIG. 3, the mounting holes 46 and 50 (not shown) allow the adapter 10 to be mounted to a conduit body 54 with mounting screws 58 using the cover holes 56 of the conduit body 54. It is contemplated that lower rim 18 of adapter 10 seats substantially flush on a face of a conduit body 54 to which it is attached. A standard electrical fixture 60 may be attached to the conduit body adaptor 10 by matching screw holes 62 on the standard fixture 60 to appropriately spaced screw holes 38 on the upper rim 16 of the adaptor adaptor 10. Mounting screws 64 may then be used to mount the standard fixture 60 to the adaptor 10.

It is also contemplated that a cover 68 may be placed onto the upper rim 16 over the standard fixture 60 mounted within the adaptor 10. While cover 68 is shown as being attached to the standard fixture 60 by a central screw 70 and thread opening 72, it should be appreciated that cover 68 may also be attached by strategically placed screw holes (not shown) that align with one or more holes of the plurality of screw hole pairs located on the upper surface.

In one aspect of the invention, the cover 68 preferably has a smooth, essentially uninterrupted surface which conforms to upper rim 16 of sidewall 12. The cover 60 may be transparent for easy viewing of interior space 46.

Optionally, a gasket 66 may be used as a buffer between the cover 68 and the fixture 60. The gasket 66 desirably is constructed of a flexible material such as an elastomeric material.

Figure 4:
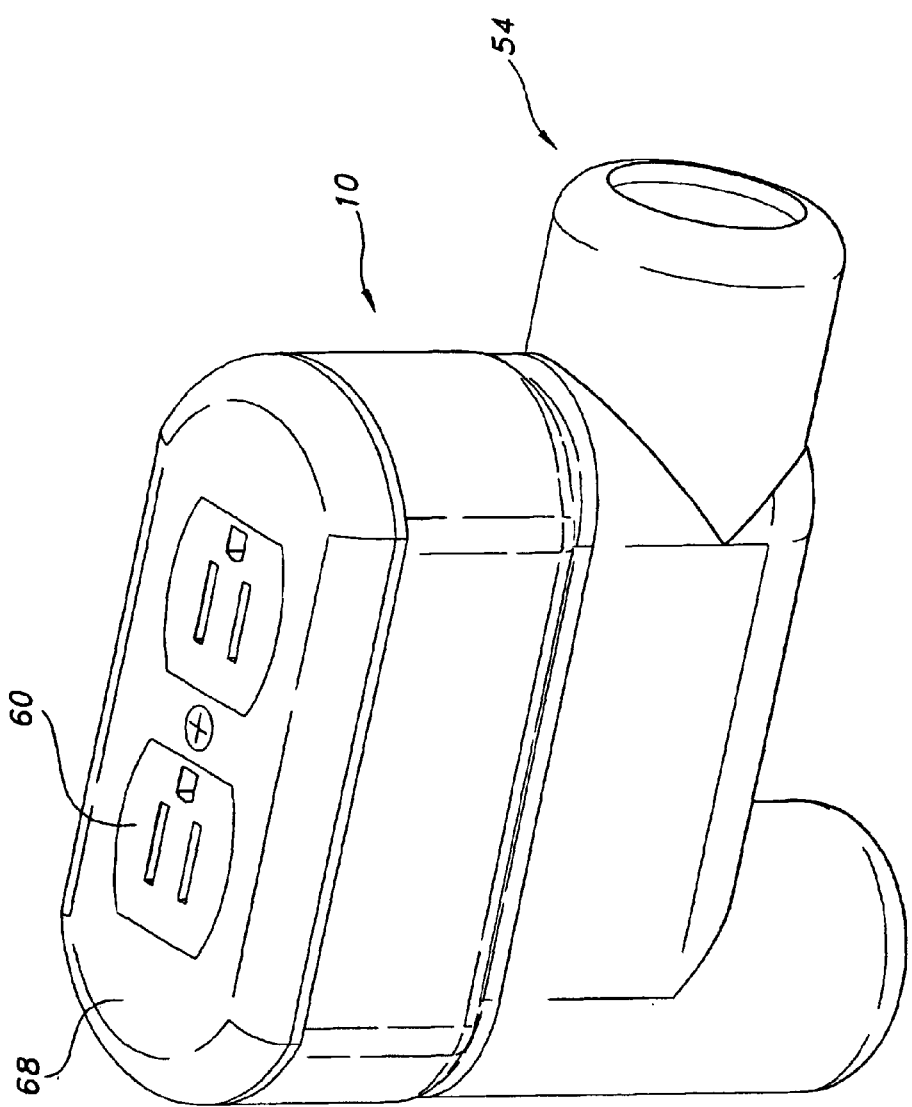
FIG. 4 is the assembly according to FIG. 4 in assembled form.

The arrangement of the conduit body adaptor 10 of the assembly of FIG. 3 is shown in assembled form in FIG. 4. The adaptor 10 in communication with a conduit body 54 is shown. The conduit body adaptor 10 according to the invention allows connections to be made between conventional conduit bodies and electrical fixtures such as light switches, cable outlets, electrical receptacles, cover plates, and the like. The conduit body adaptor 10 allows these connections to be made without being restricted to any one particular arrangement of connections or holes of the conduit bodies or electrical fixtures. As a result, the conduit body adaptor of the present invention can serve as a universal adaptor.

The module of the present invention is desirably made of a metallic material, non-metallic material or a combination thereof. Useful metallic materials include aluminum, steel, and the like. Useful non-metallic materials include polyvinyl chloride, nylons, high density polyethylene, plastics, and combinations thereof. The module may also be transparent in whole or part.

It will be apparent that the present invention has been described herein with reference to certain preferred or exemplary embodiments which may be modified, changed, added to or deviated from without departing from the intent, spirit and scope of the present invention. It is intended that all such additions, modifications, amendments and/or deviations be included within the scope of the following claims.

I claim:

1. A universal conduit body adapter, comprising:

an elongate generally tubular sidewall including an upper rim, a lower rim and a pair of parallel portions bounded by a pair of curved ends;

a first screw hole plate bridging said parallel portions, said first screw hole plate being planar with said upper rim and including a plurality of first screw holes;

a second screw hole plate bridging said parallel portions, said second hole plate being planar with said upper rim and including a plurality of second screw holes; and a pair of mounting bosses arranged on said lower rim toward each of said curved ends, said pair of mounting bosses being planar with said lower rim and defining a pair of mounting holes for mounting said adapter to a conduit body.

2. The universal conduit body adaptor according to claim 1, wherein said screw hole plates, said rims, and an interior of said sidewall are smoothly finished.

\* \* \* \* \*